United States Patent [19]

Christophe et al.

[11] Patent Number: 4,601,826

[45] Date of Patent: Jul. 22, 1986

[54] FILTER FITTED WITH A DEBLINDING DEVICE

[75] Inventors: Théophile Christophe, Fontenay Le Fleury; Jean-Claude Moatti, Boulogne, both of France

[73] Assignee: Georges Moatti, France

[21] Appl. No.: 636,100

[22] Filed: Jul. 30, 1984

[30] Foreign Application Priority Data

Aug. 8, 1983 [FR] France .................. 83 13043

[51] Int. Cl.⁴ .................. B01D 25/32; B01D 29/38
[52] U.S. Cl. .................. 210/340; 210/346; 210/426; 210/430; 210/486
[58] Field of Search .................. 210/314, 325, 332, 331, 210/333.01, 333.1, 334, 340, 346, 347, 413, 429, 430, 431, 488, 498, DIG. 13, 486

[56] References Cited

U.S. PATENT DOCUMENTS

| | | | |
|---|---|---|---|
| 2,799,397 | 7/1957 | Berline | 210/332 |
| 3,985,656 | 10/1976 | Arvanitakis | 210/334 |
| 4,136,028 | 1/1979 | Toivonen | 210/331 |
| 4,330,405 | 5/1982 | Davis et al. | 210/331 |
| 4,430,220 | 2/1984 | Litzenburger | 210/340 |

FOREIGN PATENT DOCUMENTS

| | | |
|---|---|---|
| 2120940 | 8/1972 | France . |
| 2138238 | 1/1973 | France . |
| 2143694 | 2/1973 | France . |
| 2181510 | 12/1973 | France . |

*Primary Examiner*—Richard V. Fisher
*Assistant Examiner*—Wanda L. Millard
*Attorney, Agent, or Firm*—Poms, Smith, Lande & Rose

[57] ABSTRACT

The present invention related to a filter consisting of a stack 4 of elements 5 comprising one cylindrical side and each element consisting of several isolated sections 23-24 and provided with orifices 35 for communication of its sections with the circumferences of the element and with a rotary distribution valve 37 mounted to rotate coaxially with the cylindrical side and comprising a chamber 22a for the isolation of a first section 23 from any element of the other sections, communicating with this first section through a port of the distribution valve.

The form of the port 22a and the layout of the orifices 35 are such that the first sections 23 of only one part of the elements are in communication with the chamber 22a.

One application is the manufacture of a filter of small size and high efficiency.

4 Claims, 9 Drawing Figures

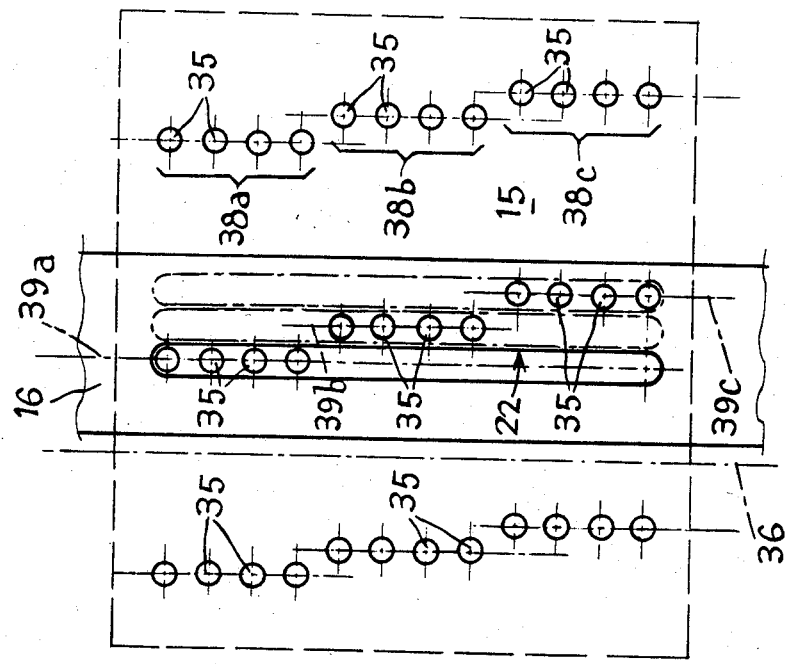
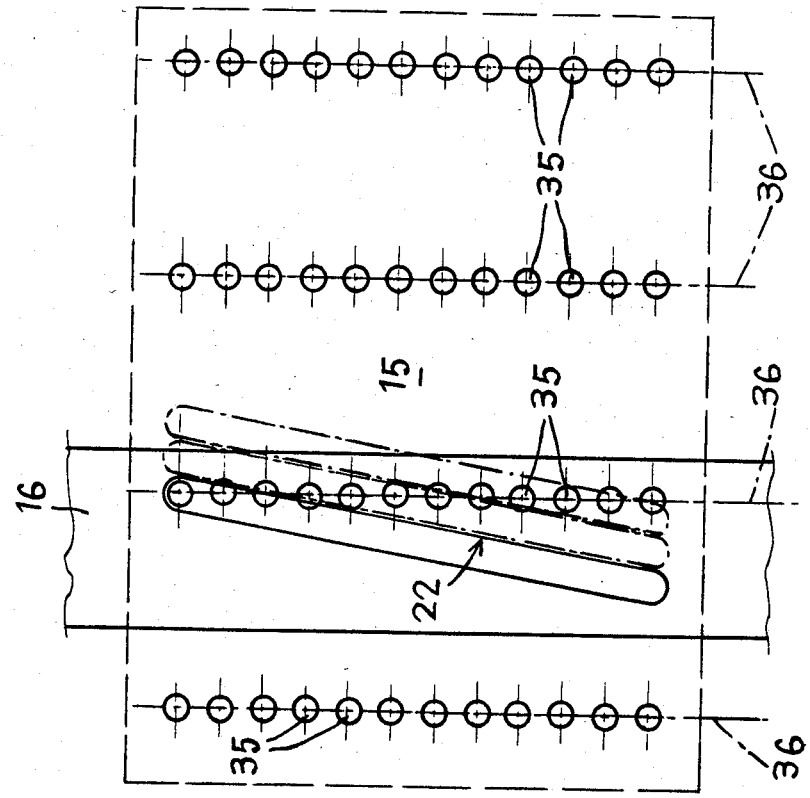

FILTER FITTED WITH A DEBLINDING DEVICE

Filters are already known that are fitted with deblinding devices, notably for engine oil or fuel.

Such a filter consists of a stack of distinct filter elements assembled together to form an annular sleeve comprising at least one cylindrical side and each filter element consisting of several sections isolated from each other while, firstly, each filter element is provided with orifices on each external and internal circumferences to allow communication of each of its sections with the said circumferences and, secondly, a rotary shut-off valve is mounted coaxially with the said cylindrical side and is provided with a shut-off chamber able to isolate a first section of any one of the filter elements from the other sections of the said element, communicating only at this given moment with the said first section by means of a port in the valve and the communication orifice of the said first section.

In this filter, the deblinding device consists of the combination of the communication orifices of the filter elements with the valve port allowing the filtration screens of the first sections to be crossed, in the form of a counter-current, by the fluid that has already filtered through the other sections and thus allows them to be freed of the dirt deposited in them.

The valve, therefore, cuts-off at each rotation at least one section of each filter element and sometimes more. Yet, it must be pointed out that a section thus cut-off is a section that is deblinding itself and, consequently, does not take part in filtration of the fluid being cleaned.

The invention, in a filter such as described above and maintaining a similar principle of deblinding, is intended to adapt it to reduce the number of sections that are being deblinded at any given moment and, consequently, correlatively increase the number of sections taking part in the work of filtration and thus increase the overall efficiency of the filter.

For this purpose, in accordance with the invention, the form of the said port and the layout of the communication orifices that are likely to be opposite to it are such that the first sections of *only part of the filter elements* are in communication with the said shut-off chamber, in a given relative position of the valve in relation to the stack of filter elements.

The three following construction variants are advantageous, with preference being given to any of them:

the distributor port consists of a helical groove while the communication orifices of the first sections of the successive filter elements are aligned along a generatrix of the cylindrical side of the sleeve placed opposite the valve;

the valve port consists of a straight groove extending parallel to a generatrix of said cylindrical side of the sleeve placed opposite the valve, while said communication orifices of the first sections are divided into distinct groups, the orifices of each group being aligned along one same generatrix of the cylindrical side of the sleeve, and the diametrical planes containing the generatrices that align the orifices of the various groups being off-set angularly from each other in order to only allow communication at any given moment of the orifices of one group of orifices only with the said valve port;

the valve port consists of several straight grooves, distinct from each other, entending parallel to a generatrix of the said cylindrical side of the sleeve placed opposite the valve, each along one part only of the height of the stack of filter elements while, firstly, the diametrical planes containing the grooves are off-set angularly from each other and, secondly, the communication orifices of the first sections of the successive filter elements are aligned along a generatrix of the said cylindrical side of the sleeve, so that at any given moment only one of the said grooves is in communication with certain of the said orifices only.

The principal advantage of the filters that comply with the invention is to disable during the deblinding phase, a number of sections of filter elements distinctly less than was needed previously. In other words, by adopting the arrangements of the invention, a filter can be built of improved efficiency than previously within small overall dimensions, or it is possible to filter a volume of fluid greater than the volume filtered by previous filters.

It should, moreover, be pointed out that this increased efficiency is not attained to the detriment of the filtration quality because each filter element is deblinded as well as it was previously and, therefore, maintains its capability of correct filtration. The first saving was only realized by using a smaller volume of deblinding fluid to deblind a number of filter elements which was also less.

If allowance is made, furthermore, for the fact that the deblinding fluid is generally taken from the fluid already filtered, there is a second saving, consisting of only taking for deblinding a smaller quantity of already-filtered fluid.

The invention will be better understood and its secondary characteristics and their advantages will appear from the description of implementations given below as examples.

It is understood that the description and the drawings are only given for information purposes and are not exhaustive.

Reference is made to the appended drawings in which:

FIG. 6 is a developed view of the cylindrical surfaces opposite the valve and of the stack of filter elements of a second arrangement in accordance with the invention;

FIG. 8 is a developed view of the cylindrical surfaces of the valve and of the stack of filter elements of a third arrangement in accordance with the invention.

Figure 1:
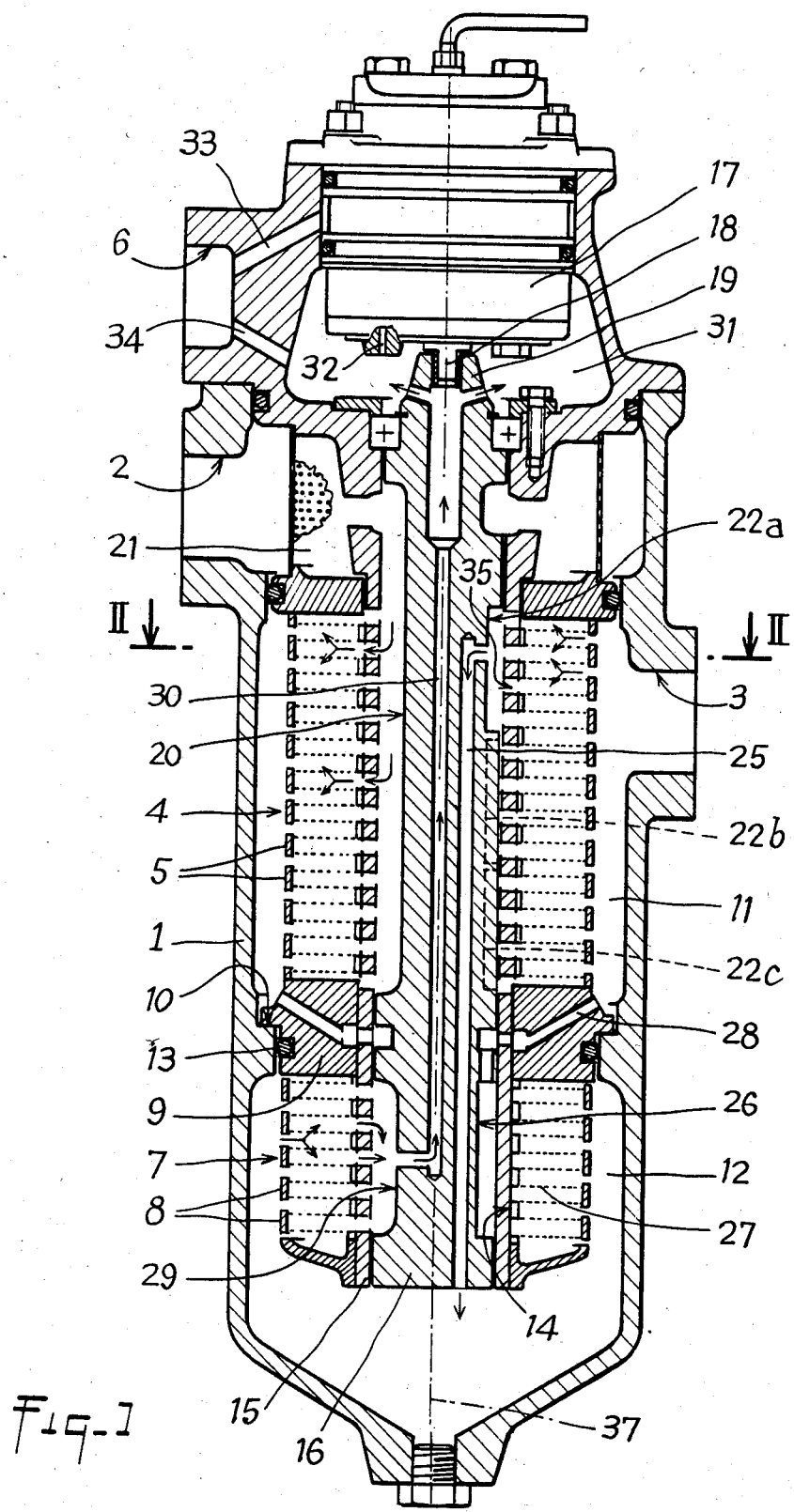
FIG. 1 is an axial cross-section of a filter that conforms with the invention.
Figure 2:
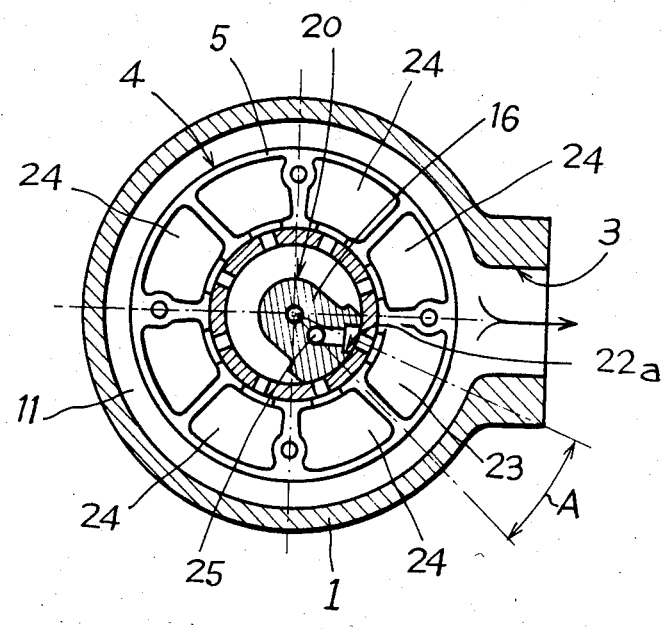
FIG. 2 is a cross-section along II—II of FIG. 1.
Figure 4:
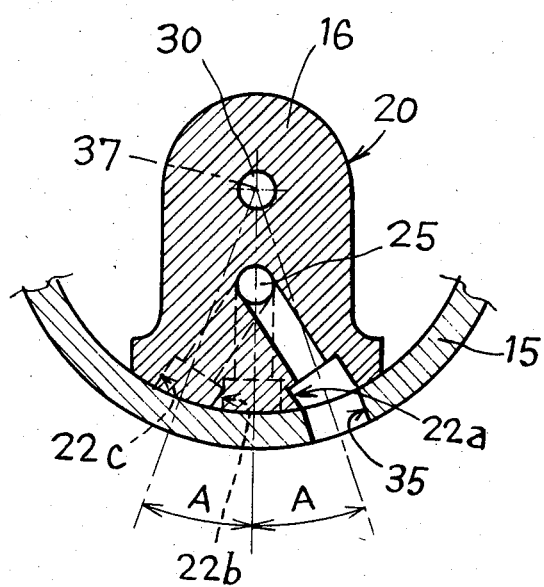
FIG. 4 is a partial cross-section of a detail of the valve illustrated in FIGS. 1 and 2.
Figure 5:
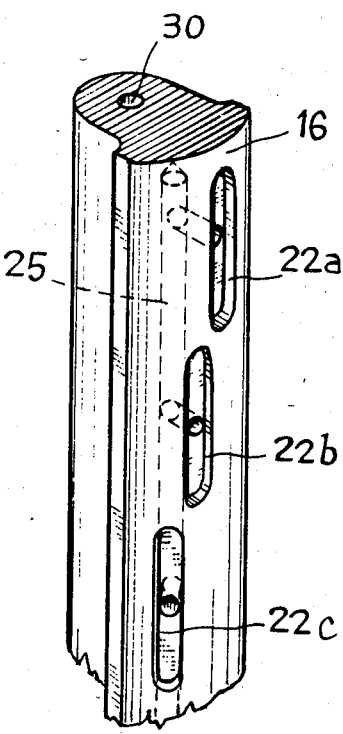
FIG. 5 is a perspective view of the valve illustrated in FIGS. 1 and 2.

The filter of FIGS. 1 and 2 comprises:

a filter body 1 fitted with an admission union 2 for the fluid to be filtered, an evacuation union 3 for the filtered fluid through a main stack 4 of filtration elements 5 and an evacuation union 6 for the deblinding fluid of filter elements 5, after this deblinding fluid has been filtered by secondary stack 7 of filter elements 8, the said main stacks 4 and secondary 7, separated by an intermediate piece 9 that bears on a shoulder 10, with which is fitted body 1, and which provides inside the said body two main 11 and secondary 12 chambers separated by seal 13, the main chamber 11 communicating with the evacuation union 3, a bore 14, common to the two stacks 4 and 7, to which is fitted an inside ring 15, inside which a rotary valve 16 is mounted, a hydraulic motor 17 providing step-by-step operation of the valve 16, mounted on body 1 and connected by a drive head 18 to one end 29 of the valve 16, a peripheral groove 20 cut in the valve 16, that communicates with the admission chamber 21 of the fluid to be filtered, itself in communication with admission union 2, a triple groove 22a, 22b and 22c cut in the valve 16 and allowing isolation of an angular section 23 of a few only of the filter elements 5 (not all, as will be explained below) of the main stack 4 of the other angular sections 24 of the same filter elements 5, a duct 25 inside valve 16 with which each groove 22a, 22b and 22c communicates, and which ends in the secondary chamber 12, a groove 26 cut in valve 16 and communicating, firstly, with only one angular section 27 of each filter element 8 of the secondary stack 7 and, secondly, with the main chamber 11 through duct 28 cut in the intermediate piece 9, a peripheral groove 29 cut in valve 16, which communicates by a duct 30 inside valve 16 with an upper chamber 31 provided in body 1, feed cuts 32 of motor 17 communicating with upper chamber 31, exhaust duct 33 of motor 17 communicating with evacuation union 6, a calibrated connection duct 34 (with specific pressure loss) connecting upper chamber 31 to evacuation union 6.

Figure 3:
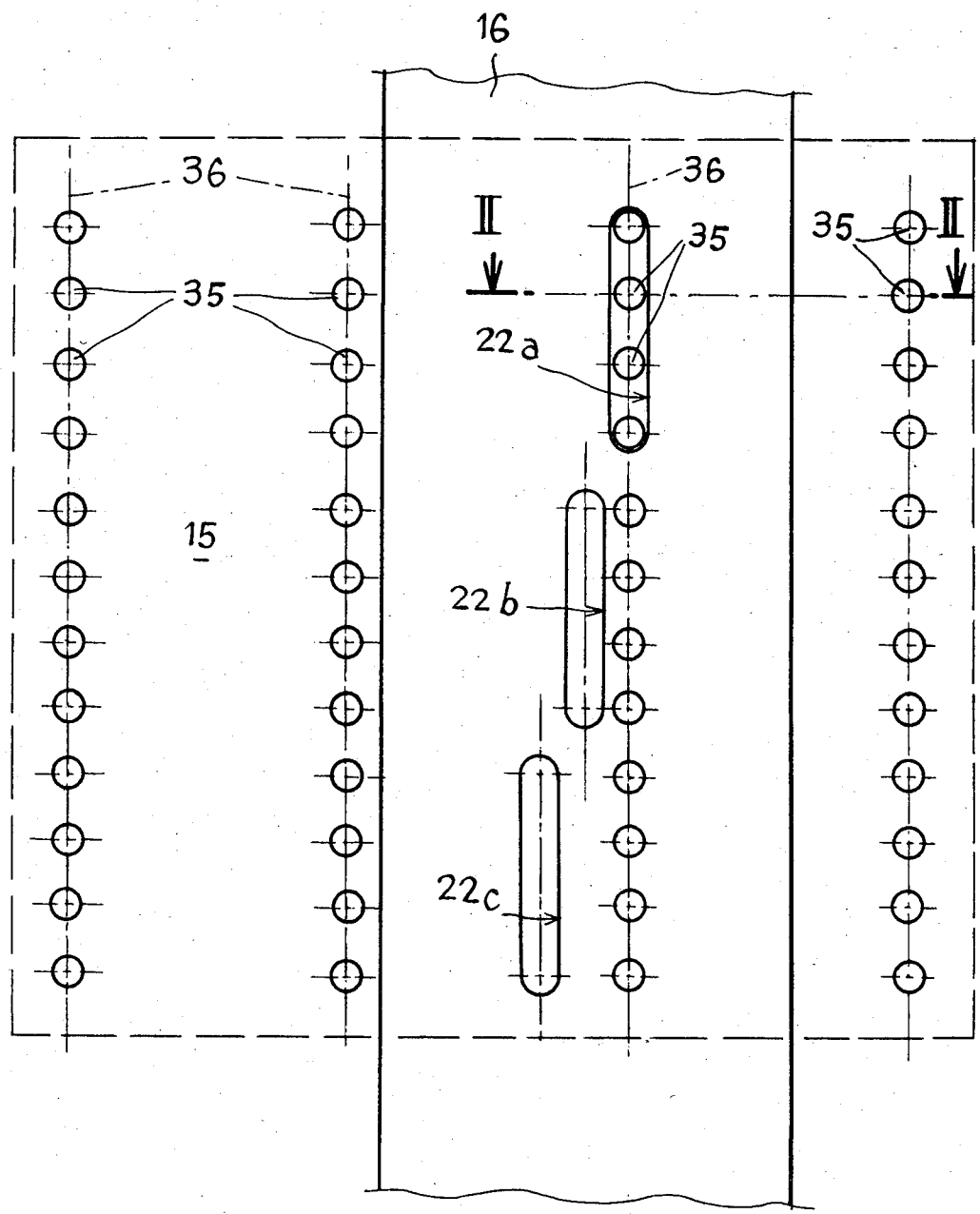
FIG. 3 is a developed view of the cylindrical surfaces of the valve and of the stack of filter elements opposite it.

Traditionaly, ring 15, of which a developed view is given in FIG. 3, superimposed on a view of the side of valve 16 opposite it, comprises cross-through holes 35 which, in the arrangement of FIGS. 1 to 4 are aligned on the generatrices 36 of ring 15 and correspond to the orifices of the internal circumference of the main stack 4. Stack 4 also comprises orifices cut in its outside circumference; the internal and external circumference orifices are separated by the screens of the filter elements.

The structure of secondary stack 7 is similar with orifices in the internal and external circumferences separated by the filter screens.

It is known that the fluid that needs to be filtered is admitted into admission chamber 21, arrives at groove 20 of the valve, passes through the orifices of the inside circumference of sections 24 of the filter elements 5 which are opposite groove 20, then through the corresponding holes 35 of ring 15, crossing the screens, and then the orifices of the external circumference of the same sections and then enters, filtered, main chamber 11, to be then evacuated through evacuation union 3.

Nevertheless, part of the filtered fluid contained in main chamber 11 crosses, in reverse direction from the external circumference to the internal circumference of stack 4, those sections 23 of filter elements 5 which are placed opposite one of the grooves 22a, 22b or 22c (in fact, groove 22a in the configuration of FIG. 3). This small quantity of filtered fluid is used to clean the said screens of sections 23 of the dirt in them and thus to render them again able to carry out efficient filtration. This part of the fluid which crosses through the screens of sections 23 is collected by the groove opposite these sections (22a of FIG. 3) and is directed through duct 25 to the secondary chamber 12.

The fluid loaded with dirt in secondary chamber 12 crosses from the outside circumference to the inside circumference of the sections of stack filter elements, opposite groove 29 of valve 16 and, filtered by the said section screens, of groove 29 is directed through duct 30, chamber 31 and duct 34 to evacuation union 6 to be used again. Note that, also known, a part of the filtered fluid in the upper chamber 31 is used as feed fluid for motor 27 (ducts 32).

The novel feature lies in the fact that during the deblinding of the screens of the filter elements 5 of the main stack 4, the sections 23 of one column only are cleaned of their dirt and, for this reason, of the sections 23 of one column, the "washing" fluid only crosses through the sections of the elements of which holes 35 are in communication with a groove 22a, 22b or 22c. Yet, as is visible on FIG. 4, each of these grooves is straight (parallel to a generatrix of ring 15 placed opposite), parallel to generatrices 36 that align holes 35 of one column of sections 23 or 24, and is off-set angularly in relation to rotation axis 37 of valve 16, by an angle "A" in relation to the adjacent groove, so that with one valve 16 with three distinct grooves 22a, 22b and 22c, as illustrated in FIGS. 1 to 5, only one-third of the holes 35 are placed opposite the said grooves during work of washing/deblinding. Thus, the washing fluid only crosses through one-third of sections 23 of one column at any given moment. Of course, when the valve next rotates, it is the sections 23 of the next third of filter elements which then communicate with groove 22b. Then, after groove 22b, it is groove 22c which allows deblinding of the relevant sections 23 following a fresh rotation of valve 16. Only one-third of the sections of one column can be deblinded at a given moment.

Of course, with the new recommended arrangement, the flow rate of deblinding fluid for the same efficiency of deblinding is one-third of the flow rate required previously, when all the sections of one column of filter elements were deblinded. The flow rate is, therefore, only one-third of what it was previously but, because it is taken from main chamber 11, it must be deducted from the flow of effectively utilisable filtered fluid that can be evacuated through union 3. This leads to the fact that the fluid used for deblinding constitutes, in some way, a loss of filtered fluid. In the new arrangement, this loss has been divided by three which is considerable.

Furthermore, at a given moment, all the sections of all the filter elements 5 of the main stack 4 are active in cleansing the fluid to be filtered, excepting the few sections 23 which are being deblinded. The invention leaves all the other sections available for filtering, by reducing the number of sections 23 being deblinded. Thus, in accordance with the new recommended design, a complete filter of given size can filter a flow rate of fluid higher than the flow rate that a complete traditional filter could filter. This point also leads to a gain of efficiency.

Figure 7:
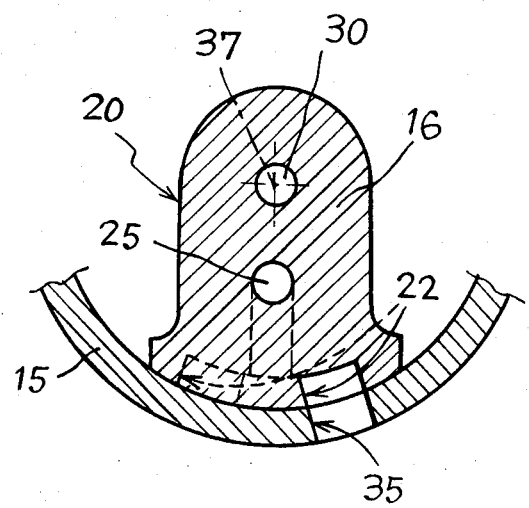
FIG. 7 is a partial cross-section of a detail of the valve of the arrangement illustrated in FIG. 6.

The same principle of simultaneous deblinding of only a few sections of one column of filter element sections only apply to arrangements other than those illustrated in FIGS. 1 to 5. Two such arrangements are illustrated in FIGS. 6 and 7 firstly, and 8 and 9 secondly. In each arrangement, holes 35 and valve groove 16 are off-set in relation to each other.

In the arrangement in FIGS. 6 and 7, this off-set is provided by the helical shape given to valve groove 22, the said groove covering at most one part of the holes 35 of one column, the said holes being aligned over a generatrix 36.

Figure 9:
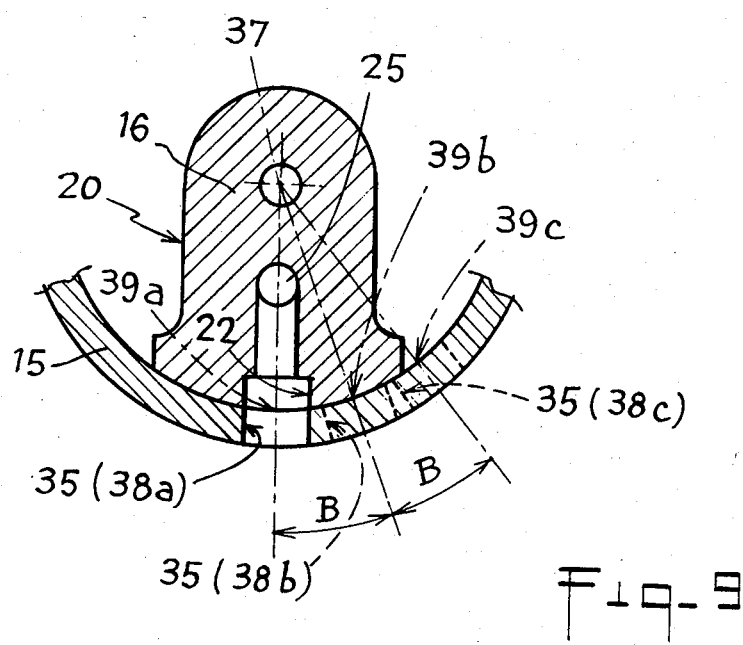
FIG. 9 is a partial cross-section of a detail of the valve of the arrangement illustrated in FIG. 8.

In the arrangement in FIGS. 8 and 9, the off-set is obtained by the combination of the straight form of groove 22 (parallel to generatrices 36) and by the angular off-set "B" of the generatrices 39a, 39b and 39c that align the holes 35 of one column which are now divided into three distinct groups. At a given moment, groove 22 is only in communication with holes 35 of one only of the three groups 38a, 38b and 38c, of a column of superimposed sections.

In each of the two arrangements, the principle of operation and the advantages are the same as those explained for the arrangement of FIGS. 1 to 5.

The invention is, moreover, not limited to the arrangements illustrated but covers all variants which might be applied without abandonning either their principle or their spirit.

We claim:

1. A filter comprising:
   a stack of several distinct filter elements each having external and internal radial circumferences assembled together to form an annular sleeve having a cylindrical inner circumference, wherein each of said filter elements includes a plurality of isolated radial segments which stack to form a plurality of isolated columnar filter sections, and wherein each of said filter elements further includes on its external and internal radial circumferences a plurality of communication orifices to provide communication through each of said filter sections between said external and internal circumferences; and
   a rotary shut-off valve fitted to rotate coaxially within said sleeve and against said cylindrical inner circumference of said sleeve such that, for given successive angular positions of said valve in said sleeve, said valve opposes corresponding successive, individual filter sections to block said sections against flow therethrough, while flow through the other filter sections is permitted, said valve further having a ported shut-off chamber cut therein to oppose and communicate only with opposing communication orifices in said cylindrical inner circumference of corresponding blocked filter sections when said valve is in said given angular positions, wherein the shape of said ported shut-off chamber and the arrangement of said communiction orifices opposing it are such that, for said given angular positions of said valve in relation to said stack of said filter elements, only one part of said filter elements within said corresponding blocked filter section are in communication with said ported shut-off chamber.

2. A filter in accordance with claim 1, further characterized in that said ported shut-off chamber consists of a helical groove cut in said valve, and said communication orifices of each of said filter sections located in said cylindrical inner circumference are aligned along a generatrix of said cylindrical inner circumference of said sleeve placed opposite said valve.

3. A filter in accordance with claim 1, further characterized in that said ported shut-off chamber consists of a straight groove extending parallel to a generatrix of said cylindrical inner circumference of said sleeve placed opposite said valve, and said communication orifices of each of said filter sections located in said cylindrical inner circumference are divided into distinct groups, said orifices of each said group being aligned along a generatrix of said cylindrical inner circumference, the diametrical planes containing said generatricies being off-set from one another such that said ported shut-off chamber communicates with only one of said groups of said communication orifices at any given moment.

4. A filter in accordance with claim 1, further characterized in that said ported shut-off chamber consists of a plurality of straight grooves distinct from each other and extending parallel to a generatrix of said cylindrical inner circumference of said sleeve placed opposite said valve, said grooves extending along consecutive portions of the height of said stack of filter elements and being off-set circumferentially from each other, and said communication orifices of each of said filter sections located in said cylindrical inner circumference are aligned along a generatrix of said cylindrical inner circumference such that only one of said grooves is in communication with only a part of said communication orifices within a given filter section at any given moment.

* * * * *